(12) United States Patent
Nakamura et al.

(10) Patent No.: US 8,964,926 B2
(45) Date of Patent: Feb. 24, 2015

(54) EX-CORE NUCLEAR INSTRUMENTATION SYSTEM

(75) Inventors: Shingo Nakamura, Chiyoda-ku (JP); Tatsuro Kobayashi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 653 days.

(21) Appl. No.: 13/233,518

(22) Filed: Sep. 15, 2011

(65) Prior Publication Data

US 2012/0201339 A1    Aug. 9, 2012

(30) Foreign Application Priority Data

Feb. 3, 2011    (JP) .................. 2011-021902

(51) Int. Cl.
*G21C 17/108* (2006.01)
*G01T 1/17* (2006.01)

(52) U.S. Cl.
CPC .............. *G21C 17/108* (2013.01); *G01T 1/17* (2013.01)
USPC .......................................... 376/255; 376/259

(58) Field of Classification Search
USPC .......................................... 376/254, 255, 259
See application file for complete search history.

(56) References Cited

U.S. PATENT DOCUMENTS

| | | | | |
|---|---|---|---|---|
| 5,164,895 | A * | 11/1992 | Lunz et al. | 700/9 |
| 5,805,559 | A * | 9/1998 | Murakami et al. | 369/47.5 |
| 6,381,449 | B1 * | 4/2002 | Yamaji et al. | 455/313 |
| 7,139,354 | B2 * | 11/2006 | Izumi et al. | 376/255 |
| 8,116,421 | B2 * | 2/2012 | Kitazono | 376/255 |
| 2005/0233714 | A1 * | 10/2005 | Kajiwara et al. | 455/127.3 |

FOREIGN PATENT DOCUMENTS

| | | |
|---|---|---|
| JP | 51-122476 A | 10/1976 |
| JP | 6-291572 A | 10/1994 |
| JP | 10-224156 A | 8/1998 |
| JP | 10-253795 A | 9/1998 |
| JP | 10253795 A * | 9/1998 |
| JP | 2000-101353 A | 4/2000 |
| JP | 2000-266884 A | 9/2000 |
| JP | 2003-8375 A | 1/2003 |

OTHER PUBLICATIONS

Japanese Office Action ( Notification of Reason for Refusal) dated Jun. 4, 2013, issued in corresponding Japanese Patent Application No. 2011-021902, and an English Translation of the Japanese Office Action. (6 pgs.).

* cited by examiner

*Primary Examiner* — Jack W Keith
*Assistant Examiner* — Daniel Wasil
(74) *Attorney, Agent, or Firm* — Buchanan Ingersoll & Rooney PC

(57) ABSTRACT

An ex-core nuclear instrumentation system in which the width of measurable neutron detector current can be accurately widened is obtained. In order to output the condition of neutron flux in operation by performing arithmetic processing of a current value measured by a neutron detector by using a detector signal processing circuit, the detector signal processing circuit includes a current/voltage conversion unit which converts the current value converted by the neutron detector into a voltage value corresponding to the current value; and a variable gain amplification unit which has an operational amplifier having a resistance circuit for corresponding to current levels, the resistance circuit being capable of selecting a gain, and a D/A converter that adjusts the gain, and amplifies the voltage value converted by the current/voltage conversion unit.

4 Claims, 5 Drawing Sheets

EX-CORE NUCLEAR INSTRUMENTATION SYSTEM

BACKGROUND OF THE INVENTION

1. Field of the Invention

The present invention relates to an ex-core nuclear instrumentation system that monitors neutron flux outside a reactor vessel and, more particularly, relates to a detector signal processing circuit (I/E amplifier) to be located in an ex-core nuclear instrumentation panel that constitutes the ex-core nuclear instrumentation system.

2. Description of the Related Art

An ex-core nuclear instrumentation system continuously monitors neutron flux outside a reactor vessel of a pressurized water reactor (PWR) and accordingly the state of the reactor at start and in operation is monitored; and when an abnormality is detected in the condition of the neutron flux, the ex-core nuclear instrumentation system outputs an alarm signal and a signal for emergency shutdown of the reactor and accordingly the reactor is protected. The ex-core nuclear instrumentation system mainly includes a neutron detector that measures the neutron flux and converts the same into a current value and an ex-core nuclear instrumentation panel that performs arithmetic processing of the converted current value to convert into the signals.

Generally, a neutron measurement range of the ex-core nuclear instrumentation system is divided into a neutron source range, an intermediate range, and an output range (operation range) depending on the level of neutron flux from a stopped state to output operation of the reactor. The structure and function of the neutron detector and the ex-core nuclear instrumentation panel is different for each range, and a detector signal processing circuit (I/E amplifier, that is, current/voltage amplifier) is used for arithmetic processing of the output range. The present invention relates to the detector signal processing circuit in the output range.

FIG. 5 is a configuration diagram showing a general configuration of an ex-core nuclear instrumentation system in an output range. An ex-core nuclear instrumentation system 14 includes a neutron detector 3 and an ex-core nuclear instrumentation panel 1. The neutron detector 3 is located in a plural number around outside a reactor vessel 16 to be provided inside a reactor containment vessel 15. The neutron detector 3 measures neutron flux leaked from the reactor vessel 16 and converts the same into a current value. The current value is inputted to a detector signal processing circuit 8 of the ex-core nuclear instrumentation panel 1 and is converted into an output voltage corresponding to a reactor power level. Then, the output voltage of the detector signal processing circuit 8 is inputted to a signal processing card 11. The signal processing card 11 performs analog/digital (A/D) conversion and engineering value conversion, and outputs various signals to an operation panel 12 and an input and output card 13 in a reactor protection based system 2.

[Patent Document 1] Japanese Unexamined Patent Publication No. 2003-8375 (FIG. 1, FIG. 2, and Paragraph Number [0015])

A relatively large number of neutrons are leaked from the conventional PWR reactor vessel, and the neutron detector current value is relatively large (for example, 100 μA to 3 mA) in the detector signal processing circuit 8 in the ex-core nuclear instrumentation panel 1 corresponding to the output range during the operation of the reactor. In an advanced PWR (APWR) that is improved from the conventional PWR, a small number of neutrons are leaked outside the reactor vessel by an improvement in performance of a reflector that makes the neutrons reflect in the reactor vessel; and therefore, a value (for example, 1 μA to 30 μA) which is minuter than the conventional neutron detector current value needs to be measured.

For this reason, a problem exists in that, even when a neutron detector current is amplified by the detector signal processing circuit 8 corresponding to a conventional neutron detection current processing range, an output voltage level (for example, 3.3 V being amplified) cannot be obtained. The output voltage level corresponds to a reactor power level of 100% which is capable of performing arithmetic processing after the signal processing card. Furthermore, there needs a circuit configuration which achieves a high gain capable of satisfying an output voltage level corresponding to a neutron detector current processing range (1 μA to 3 mA in the case of the above example) of ex-core nuclear instrumentation that corresponds to both the conventional PWR and APWR.

Further, there needs a circuit configuration which is for obtaining a detector signal processing circuit (I/E amplifier) capable of achieving a high gain and maintaining the accuracy of a measured value by amplifying a minute current by an I/E amplifier with a high gain. Incidentally, a document shown in Patent Document 1 discloses as a variable gain amplifier.

The present invention has been made to solve the problem described above, and an object of the present invention is to provide an ex-core nuclear instrumentation system in which, even when a neutron detector current is minute, a voltage level corresponding to a reactor power level can be outputted, the correct condition of neutron flux can be obtained, and a highly accurate measured value can be obtained.

SUMMARY OF THE INVENTION

An ex-core nuclear instrumentation system according to the present invention includes: a neutron detector which measures neutron flux outside a reactor vessel, and converts the same into a current value; and an ex-core nuclear instrumentation panel which performs arithmetic processing of the converted current value by using a detector signal processing circuit, and outputs the condition of the neutron flux in operation of a reactor. The detector signal processing circuit includes: a current/voltage conversion unit which converts the current value converted by the neutron detector into a voltage value corresponding to the current value; and a variable gain amplification unit which has an operational amplifier having a resistance circuit for corresponding to current levels, the resistance circuit being capable of selecting a gain, and a D/A converter that adjusts the gain, and amplifies the voltage value converted by the current/voltage conversion unit.

Furthermore, an ex-core nuclear instrumentation system according to the present invention includes: a neutron detector which measures neutron flux outside a reactor vessel, and converts the same into a current value; and an ex-core nuclear instrumentation panel which performs arithmetic processing of the converted current value by using a detector signal processing circuit, and outputs the condition of the neutron flux in operation of a reactor. The detector signal processing circuit includes: a current/voltage conversion unit which has an operational amplifier having a resistance circuit for corresponding to current levels, the resistance circuit being capable of selecting a gain, and amplifies and converts the current value converted by the neutron detector into a voltage value corresponding to the current value; and a variable gain amplification unit which has an operational amplifier having a D/A converter that adjusts a gain, and amplifies the voltage value amplified and converted by the current/voltage conversion unit.

Further, an ex-core nuclear instrumentation system according to the present invention includes: a neutron detector which measures neutron flux outside a reactor vessel, and converts the same into a current value; and an ex-core nuclear instrumentation panel which performs arithmetic processing of the converted current value by using a detector signal processing circuit, and outputs the condition of the neutron flux in operation of a reactor. The detector signal processing circuit includes: a current/voltage conversion unit which converts the current value converted by the neutron detector into a voltage value corresponding to the current value; and a variable gain amplification unit which has an operational amplifier having two D/A converters connected in series, in which a gain is selected by one of the D/A converters in response to the level of the current value converted by the neutron detector and the gain is adjusted by the other of the D/A converters, and amplifies the voltage value converted by the current/voltage conversion unit.

According to an ex-core nuclear instrumentation system of the present invention, even when a neutron detector current is minute, a voltage level capable of performing arithmetic processing can be outputted, the condition of neutron flux can be accurately obtained, and a highly accurate measured value can be obtained.

The foregoing and other objects, features, aspects and advantages of the present invention will become more apparent from the following detailed description of the present invention when taken in conjunction with the accompanying drawings.

DETAILED DESCRIPTION OF THE INVENTION

Preferred Embodiment 1

Figure 5:
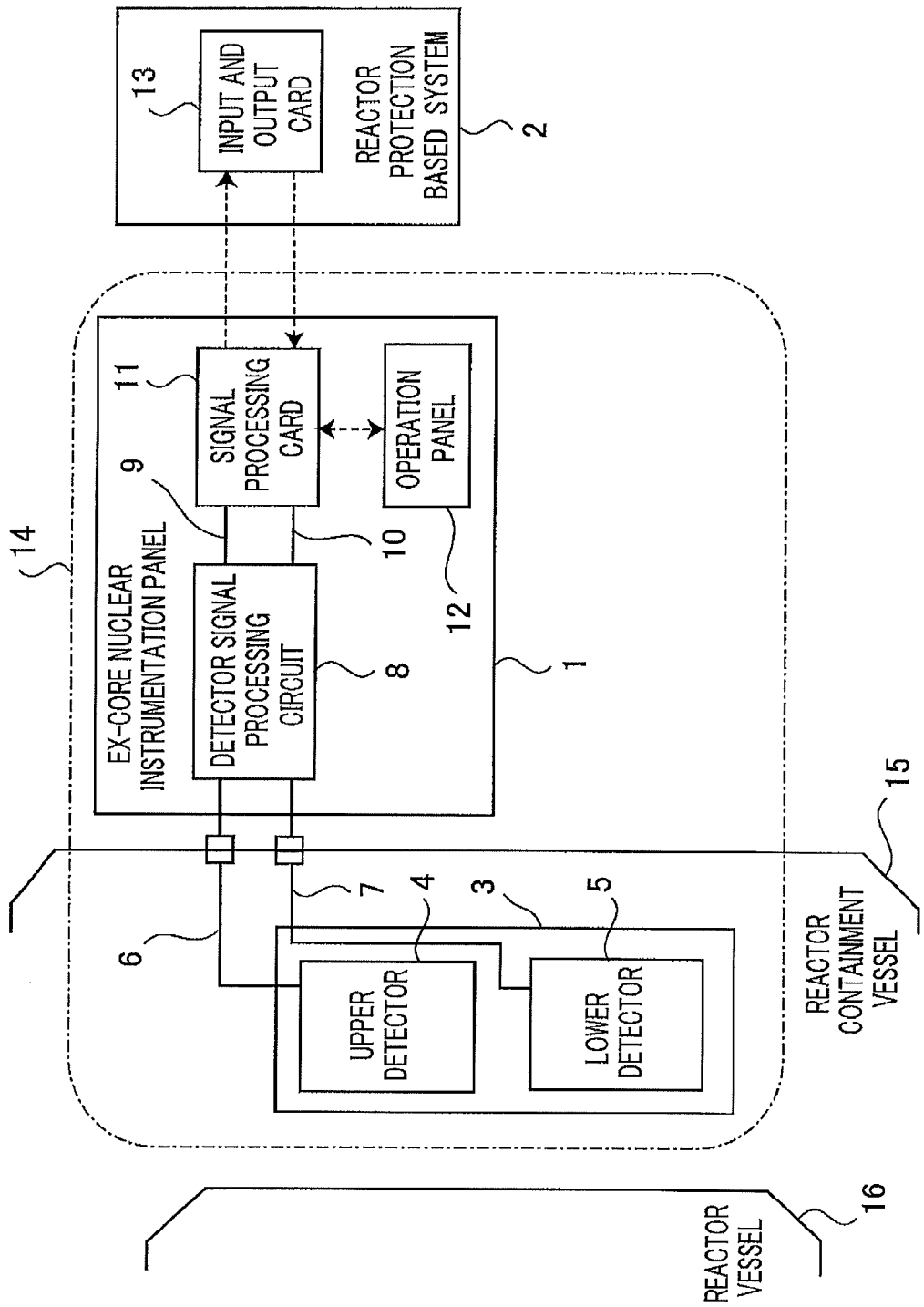
FIG. 5 is a configuration diagram showing a general configuration of an ex-core nuclear instrumentation system in an output range.

FIG. 5 is a configuration diagram showing a general configuration of an ex-core nuclear instrumentation system in an output range. In FIG. 5, a neutron detector 3 of an ex-core nuclear instrumentation system 14 is provided around outside a reactor vessel 16 which is to be located in a reactor containment vessel 15. The neutron detector 3 is one in which an upper detector 4 and a lower detector 5 are integrated. The upper detector 4 detects a neutron leaked from an upper part of the reactor vessel 16 and converts the same into a current value; and the lower detector 5 detects a neutron leaked from a lower part of the reactor vessel 16 and converts the same into a current value. The current value converted by the upper detector 4 is inputted to a detector signal processing circuit 8 located in an ex-core nuclear instrumentation panel 1 of the ex-core nuclear instrumentation system 14 via an upper detector cable 6, the ex-core nuclear instrumentation panel 1 being usually located outside the reactor containment vessel 15. The current value converted by the lower detector 5 is also similarly inputted to the detector signal processing circuit 8 via a lower detector cable 7.

The detector signal processing circuit 8 has a circuit corresponding to the upper detector 4 and a circuit corresponding to the lower detector 5, respectively; and, by the detector signal processing circuit 8, the current values are converted into an output voltage for the upper detector 9 and an output voltage for the lower detector 10. Both output voltages 9 and 10 are inputted to a signal processing card 11 in the ex-core nuclear instrumentation panel 1. The signal processing circuit 11 performs analog/digital (A/D) conversion and engineering value conversion, and outputs various signals to an operation panel 12 and an input and output card 13 in a reactor protection based system 2.

Figure 1:
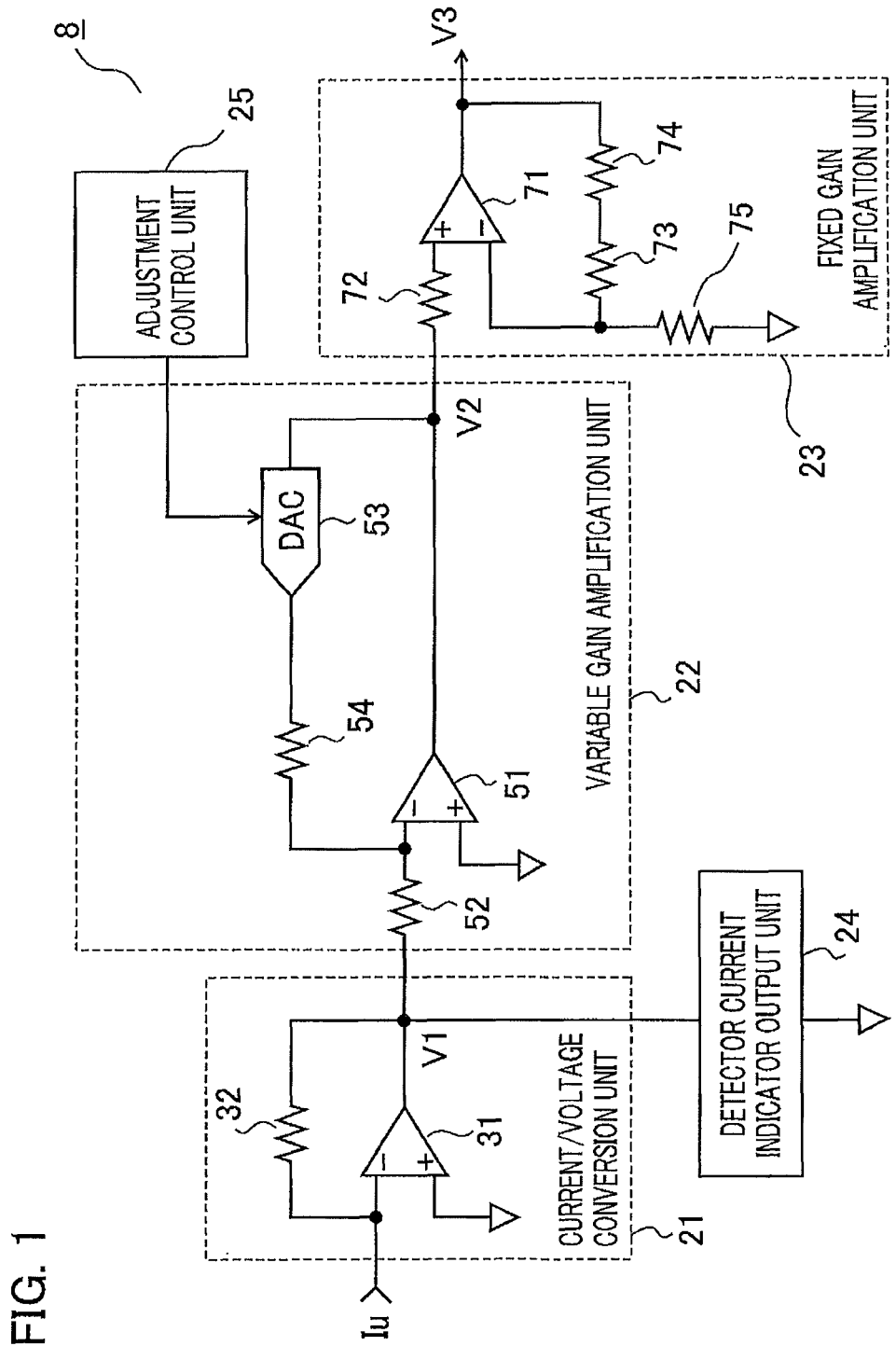
FIG. 1 is a basic circuit configuration diagram showing a detector signal processing circuit.

FIG. 1 is a basic circuit configuration diagram showing the detector signal processing circuit 8 for the upper detector 3 or the lower detector 4. The detector signal processing circuit 8 includes a current/voltage (I/E) conversion unit 21 which converts a current value Iu, in which neutron flux detected by the upper detector 3 or the lower detector 4 is converted, into a voltage value V1; a variable gain amplification unit 22 in which the voltage value V1 is amplified to a voltage value V2 as a first stage; a fixed gain amplification unit 23 in which the once amplified voltage value V2 is amplified to an output voltage V3 as a second stage and the output voltage V3 is outputted from the detector signal processing circuit 8; a detector current indicator output unit 24 which indicates the voltage value V1 converted by the current/voltage conversion unit 21; and an adjustment control unit 25 which adjusts the amplification width of the variable gain amplification unit 22. Incidentally, the fixed gain amplification unit 23 is placed at a subsequent stage of the variable gain amplification unit 22 in FIG. 1 and in the above mention; however, the variable gain amplification unit 22 can be placed at a subsequent stage of the fixed gain amplification unit 23.

As for the function of the detector signal processing circuit 8, first, the current Iu measured by the neutron detector is inputted to an inverting amplifier 31 using an operational amplifier by the current/voltage conversion unit 21, and the voltage value V1 corresponding to the current Iu is outputted. Reference numeral 32 denotes a resistor. In FIG. 1, gains of the current/voltage conversion unit 21 and the fixed gain amplification unit 23 (to be described later) are constant. Next, a detector current is indicated by the detector current indicator output unit 24 depending on the voltage value V1 and the voltage value V1 is inputted to an inverting amplifier 51 serving as an operational amplifier of the variable gain amplification unit 22.

In the variable gain amplification unit 22, adjustment of a D/A converter 53 is preliminarily performed by the adjustment control unit 25 in order to correct the output voltage V3 to a voltage value corresponding to reactor power; and accordingly, the output voltage V3 of the detector signal processing circuit 8 is determined. That is, the amplification width of the variable gain amplification unit 22 is adjusted by the adjustment control unit 25 based on a value of the detector current indicator output unit 24 which provides an output indication of the voltage value V1 in which the detector current Iu is converted by fixed gain amplification of the current/voltage conversion unit 21. Incidentally, the adjustment is performed after the neutron detector 3 (FIG. 5) is located; the adjustment absorbs detection accuracy generated from the reactor power, the amount of neutron leakage from the reactor vessel 16 (FIG. 5), error of the located detector, the located position thereof, and the like; and the adjustment is performed by a worker with the adjustment control unit 25 from the relationship between reactor power obtained by other unit (for example, in-core nuclear instrumentation, in-core temperature instrumentation, or the like) and the detector current indicator output unit 24. Furthermore, automation of the worker's work is adopted and determined by the concept of an instrumentation system of the whole nuclear plant, and a problem does not particularly exist even if this ex-core nuclear instrumentation system adopts the automation. In the case of achieving the automation, it may be such that a signal of the voltage value of the detector current indicator output unit 24 and a signal of the reactor power in which the reactor protection based system 2 (FIG. 5 or an instrumentation system of other nuclear plant (not shown in the drawing)) has are inputted to the adjustment control unit 25, the amplification width is calculated from these values, and the D/A converter 53 is adjusted.

The D/A converter 53 is an electronic circuit (for example, a 12-bit circuit) in which a digital electrical signal from the adjustment control unit 25 is converted into an analog electrical signal (resistance value), and the D/A converter 53 can convert to a resistance value having a fineness of approximately ⅒₀₀₀₀. Then, the voltage value V2 of the output of the variable gain amplification unit 22 is amplified by a non-inverting amplifier 71 serving as an operational amplifier of the fixed gain amplification unit 23, and the output voltage V3 of the output signal is inputted to the signal processing card 11 (FIG. 5). In this case, the output voltage V3 of the output signal is a voltage value corresponding to the reactor power (for example, a voltage value of 3.3V corresponding to 100% reactor power), and a voltage value of a certain level corresponding to the reactor power is required for performing arithmetic processing after the signal processing card 11; and therefore, the detector current Iu is converted and amplified into the voltage value by the detector signal processing circuit 8. Incidentally, 54 denotes a fixed resistor; 52 and 72 to 75 denote resistors.

Figure 2:
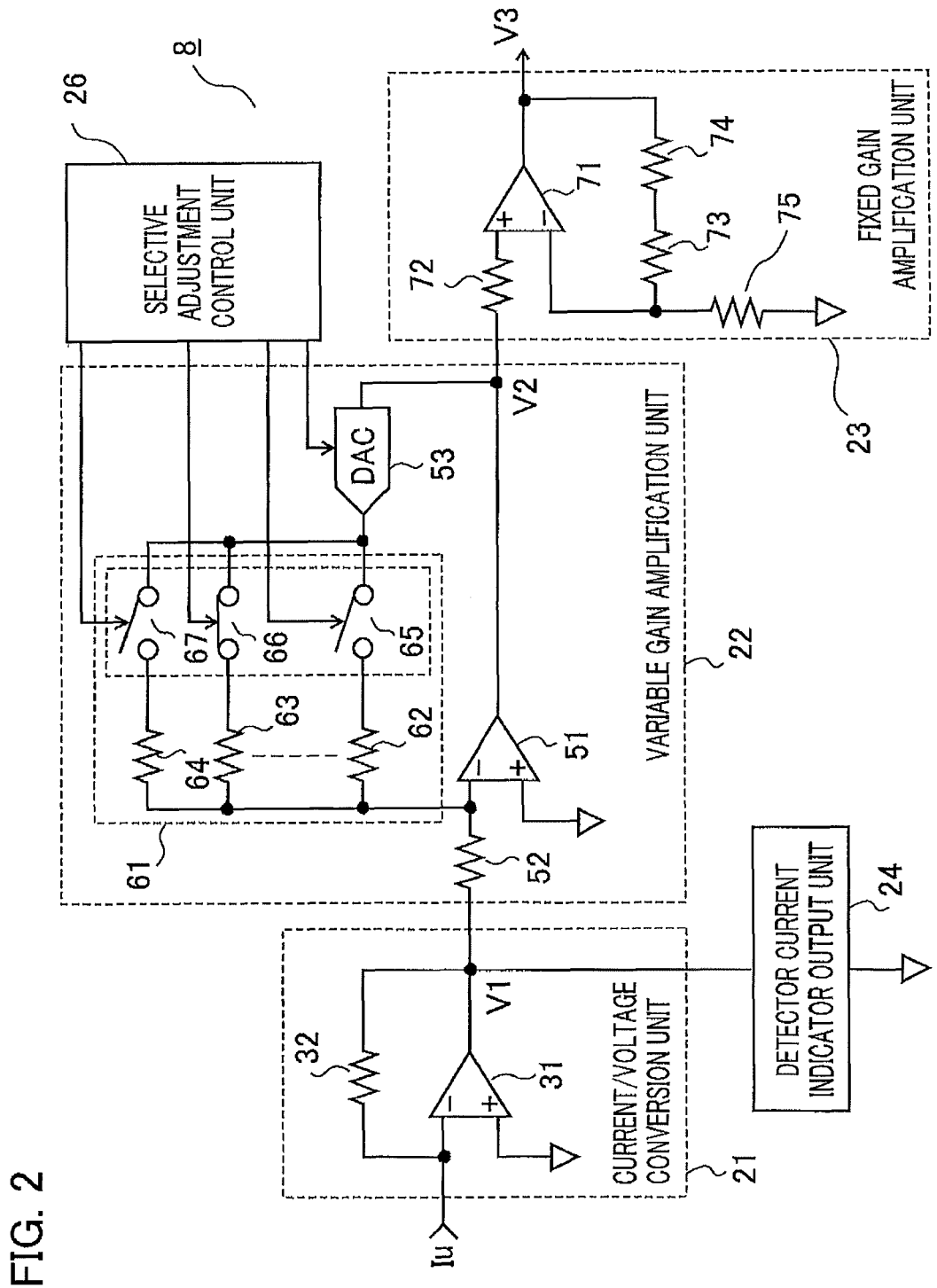
FIG. 2 is a circuit configuration diagram showing a detector signal processing circuit in a preferred embodiment 1 of the present invention.

FIG. 2 is a circuit configuration diagram showing a detector signal processing circuit (I/E amplifier) in the preferred embodiment 1 of the present invention. Those which are different from the detector signal processing circuit of FIG. 1 will be mainly described. Incidentally, the same reference numerals as those shown in the respective drawings represent the same or corresponding elements. In the circuit configuration of FIG. 2, the fixed resistor 54 (FIG. 1) of the variable gain amplification unit 22 is configured by a resistance circuit for corresponding to current levels 61 that can select a gain. The resistance circuit for corresponding to current levels 61 is configured by parallel bodies in which a plurality of series bodies, each of which is composed of a resistor and an analog switch connected in series, are connected in parallel. 62 to 64 denote resistors and 65 to 67 denote analog switches. In doing so, one of the analog switches is selected and closed to be able to provide a high resistance circuit for corresponding to a low current level. Incidentally, the resistance circuit for corresponding to current levels 61 can be configured even by a variable resistor.

A gain of the inverting amplifier 51 can be selected by selecting the resistors of the resistance circuit for corresponding to current levels 61. The resistors are defined as the resistor 62=R1, - - - , the resistor 63=R2, the resistor 64=R3; and resistance values are changed stepwise in single digit unit as R1, - - - , R2, R3=¹⁄₁₀₀R, - - - , 10R, 100R. Then, a selective adjustment control unit 26 performs on/off control of the analog switches so as to select a desirable resistor; and accordingly, the width of gain of the variable gain amplification unit 22 can be widened as compared to the fixed resistor. When the current Iu measured by the neutron detector 3 is small, a large resistance value is selected.

The gain of the variable gain amplification unit 22 can be changed by adjusting the resistance value of the D/A converter 53 by a digital electrical signal with the selective adjustment control unit 26. However, if the resistance circuit for corresponding to current levels 61 is the fixed resistor and when the resistance value is adjusted by only the D/A converter 53, the voltage change width per gain setting count value (digital electrical signal) in the D/A converter 53 increases and accuracy deteriorates in the case where the lower limit of a current input range is decreased to, for example, 1 μA. For this reason, in FIG. 2, the resistance circuit for corresponding to current levels 61 that can select the gain and the D/A converter 53 that adjusts the gain are configured in two step series, the gain is largely selected by the resistance circuit for corresponding to current levels 61 and the gain is finely adjusted by the D/A converter 53; and accordingly, the gain can be highly accurately adjusted.

Next, the selection of the resistance circuit for corresponding to current levels 61 and adjustment of the D/A converter 53 with the selective adjustment control unit 26 of the variable gain amplification unit 22 of the preferred embodiment 1 will be described. When the neutron detector current Iu corresponding to a reactor power level of 100% is inputted to the current/voltage conversion unit 21, the neutron detector current Iu is converted into the voltage value V1 and outputted by the inverting amplifier 31; and then, a detector current is indicated by the detector current indicator output unit 24 and the voltage value V1 is inputted to the inverting amplifier 51 of the variable gain amplification unit 22. At this time, the resistance value in the resistance circuit for corresponding to current levels 61 of the inverting amplifier 51 of the variable gain amplification unit 22 is selectively switched depending on the current level (the detector current indicated by the detector current indicator output unit 24) and the resistance value of the D/A converter 53 is adjusted to change the gain of the variable gain amplification unit 22; and accordingly, the output voltage V3 of the detector signal processing circuit can be made to comply with a required voltage level (for example, V3=3.3 V).

That is, when the measured current is minute and the output voltage V3 of the detector signal processing circuit does not reach the required voltage level, the resistance value is switched by selecting the resistors 62 to 64 of the resistance circuit for corresponding to current levels 61 by performing on/off control of the analog switches 65 to 67 and the resistance value of the D/A converter 53 is further adjusted to change the gain of the variable gain amplification unit 22; and accordingly, the output voltage V3 of the detector signal processing circuit 8 can be made to comply with the required voltage level. Furthermore, the D/A converter 53 is adjusted; and accordingly, the resistance value of the D/A converter 53, the resistance value selected by the resistance circuit for corresponding to current levels 61, and the resistance value including an on-resistance value of the analog switch can be finely adjusted. Therefore, the width of the gain in which the variable gain amplification unit 22 has can be largely and accurately changed as compared before by selective adjustment control; and therefore, as a result, the width of measurable neutron detector current can be widened.

The ex-core nuclear instrumentation system using the detector signal processing circuit 8 having the variable gain amplification unit 22 in which the gain is selectively adjusted as mentioned above will be described. When the neutron detector current Iu in operation of the reactor is inputted to the current/voltage conversion unit 21, the neutron detector current Iu is outputted as the voltage value V1 by the inverting amplifier 31. Next, the detector current is indicated by the detector current indicator output unit 24 and the voltage value V1 is inputted to the inverting amplifier 51 of the variable gain amplification unit 22. The voltage value V1 is amplified by the variable gain amplification unit 22, in which selective adjustment control of the gain is performed, to obtain the voltage value V2; and the voltage value V2 is amplified by the fixed gain amplification unit 23 to obtain the output voltage V3. When the reactor power is 100%, if the output voltage V3 is a preliminarily set required voltage level, the reactor is normally operated; however, in the case where the output voltage V3 exceeds the set required voltage level and abnormality is detected, an alarm signal and a signal for emergency shutdown of the reactor are outputted.

Preferred Embodiment 2

Figure 3:
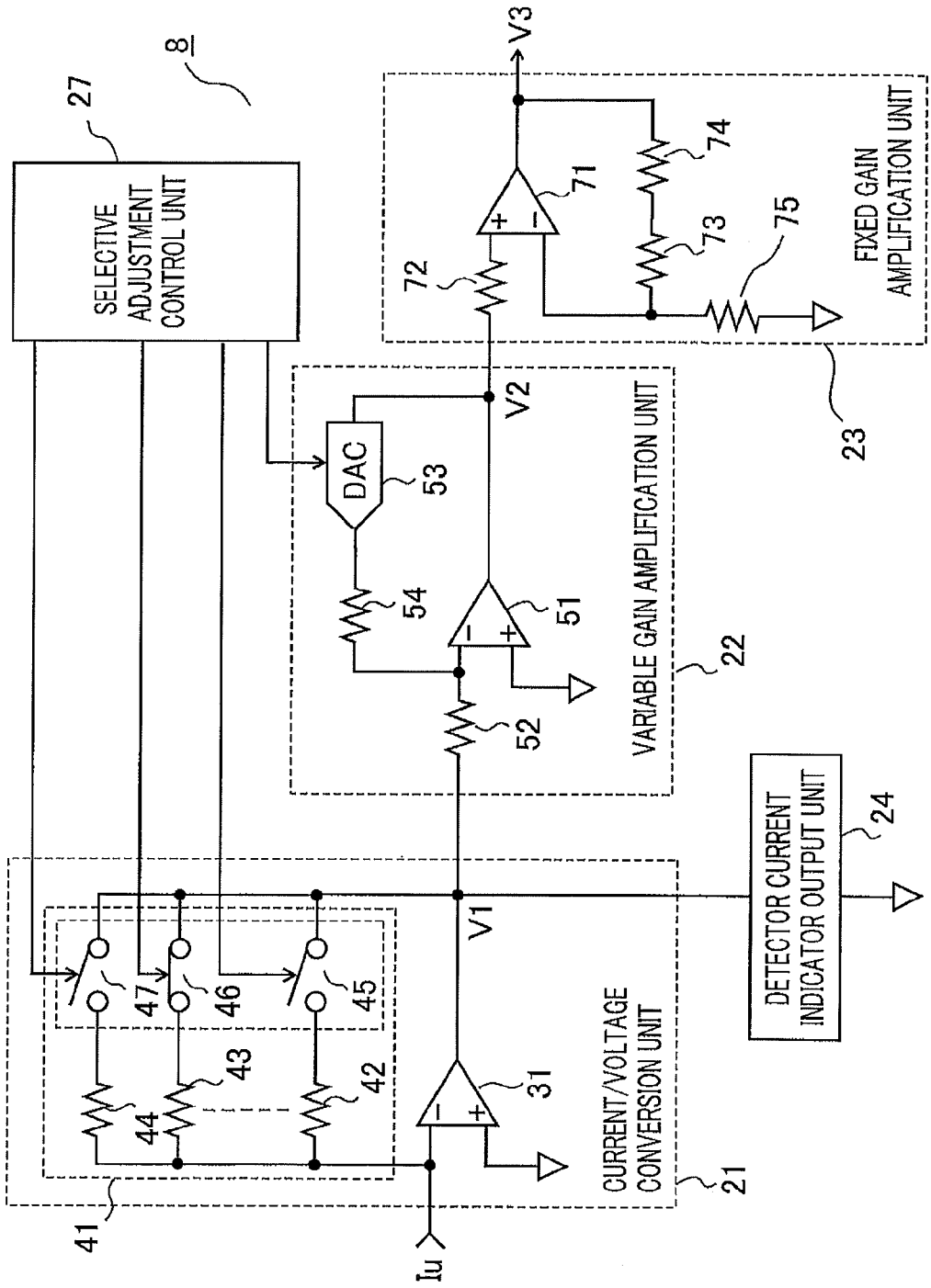
FIG. 3 is a circuit configuration diagram showing a detector signal processing circuit in a preferred embodiment 2.

FIG. 3 is a circuit configuration diagram showing a detector signal processing circuit (I/E amplifier) 8 in a preferred embodiment 2. In the preferred embodiment 1, the description has been made on the case where switching control is performed by adding the resistance circuit for corresponding to current levels 61 composed of the resistors and the analog switches to the variable gain amplification unit 22; however, in the preferred embodiment 2, as shown in FIG. 3, a resistance circuit for corresponding to current levels 41 composed of resistors and analog switches is added to a current/voltage conversion unit 21 with respect to the basic circuit configuration diagram of FIG. 1. Incidentally, reference numerals 42 to 44 denote resistors and 45 to 47 denote analog switches. A resistance value in the resistance circuit for corresponding to current levels 41 is selectively switched by a selective adjustment control unit 27 by indication of a detector current indicator output unit 24 based on a voltage value V1.

That is, when a measured current is minute and an output voltage V3 of the detector signal processing circuit does not reach a required voltage level, a resistance value is selected by the selective adjustment control unit 27 by performing on/off control of the analog switches 45 to 47 to change a gain of the current/voltage conversion unit 21; a resistance value of a D/A converter 53 provided in a variable gain amplification unit 22 is further finely adjusted by the selective adjustment control unit 27 to change a gain of the variable gain amplification unit 22; and by taking together, the output voltage V3 of the detector signal processing circuit 8 can be made to accurately comply with the required voltage level. For this reason, the width of the gain of the detector signal processing circuit can be largely and accurately changed as compared before by selective adjustment control; and therefore, as a result, the width of measurable neutron detector current can be widened.

Preferred Embodiment 3

Figure 4:
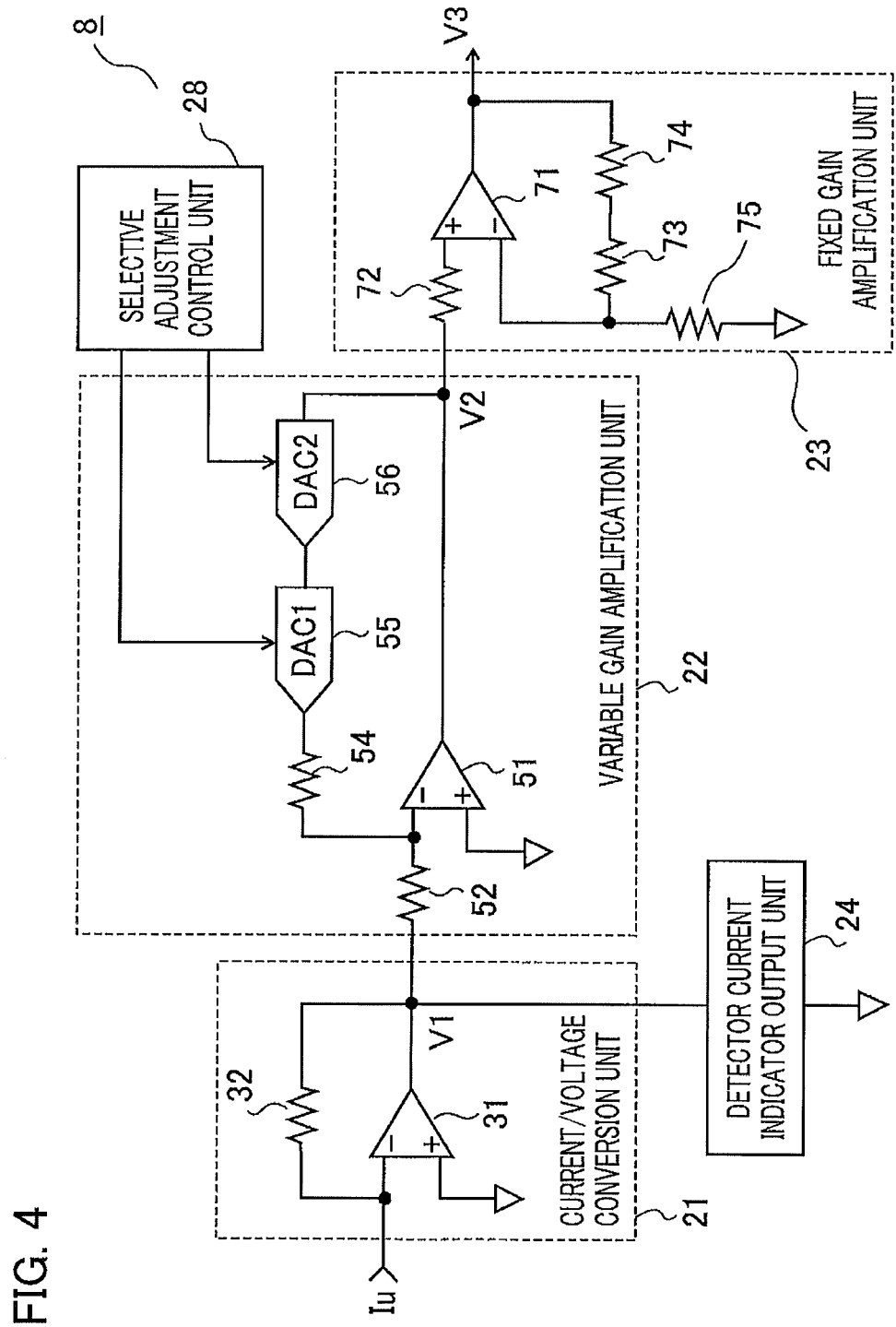
FIG. 4 is a circuit configuration diagram showing a detector signal processing circuit in a preferred embodiment 3.

FIG. 4 is a circuit configuration diagram showing a detector signal processing circuit (I/E amplifier) 8 in a preferred embodiment 3. As shown in FIG. 4, D/A converters 55 (DAC1) and 56 (DAC2) are connected in series so that the D/A converters of a variable gain amplification unit 22 are configured in two steps with respect to FIG. 1.

One D/A converter 55 corresponds to the resistance circuit for corresponding to current levels 61 of the preferred embodiment 1 and largely selects a resistance value by a selective adjustment control unit 28; and the other D/A converter 56 corresponds to the D/A converter 53 of the preferred embodiment 1 and finely adjusts the resistance value by the selective adjustment control unit 28. For this reason, a gain of the variable gain amplification unit, that is, the width of a gain of the detector signal processing circuit can be largely and accurately changed as compared before by selective adjustment control; and therefore, as a result, the width of a measurable neutron detector current can be widened.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An ex-core nuclear instrumentation system comprising:
   a neutron detector configured to measure neutron flux outside a reactor vessel, and convert the measured neutron flux into a current value; and
   an ex-core nuclear instrumentation panel configured to perform arithmetic processing of the current value by using a detector signal processing circuit, and output a condition of the measured neutron flux,
   wherein said detector signal processing circuit includes:
   a current/voltage conversion unit configured to convert the current value converted by said neutron detector into a voltage value corresponding to the current value; and
   a variable gain amplification unit comprising:
      an operational amplifier that amplifies the voltage value, said operational amplifier having a variable gain that is controlled by:
         a resistance circuit configured to select a resistance based on the current value to adjust the variable gain, and
         a digital to analog converter that is configured to adjust the variable gain.

2. The ex-core nuclear instrumentation system according to claim 1,
   wherein said detector signal processing circuit further includes:
   a detector current indicator output unit configured to indicate the current value converted by said neutron detector depending on the voltage value converted by said current/voltage conversion unit;
   a selective adjustment control unit configured to select a resistor of said resistance circuit based on the current value and adjust said digital to analog converter based on the current value indicated by said detector current indicator output unit to set amplification of the voltage value.

3. The ex-core nuclear instrumentation system according to claim 1,
   wherein said resistance circuit comprises a plurality of bodies, wherein each body is composed of a resistor and an analog switch connected in series.

4. The ex-core nuclear instrumentation system according to claim 1,
   further comprising a fixed gain amplification unit which is connected in series to said variable gain amplification unit, and configured to further amplify the voltage value amplified by the operational amplifier.

* * * * *